United States Patent
Pye

(10) Patent No.: US 12,265,551 B2
(45) Date of Patent: Apr. 1, 2025

(54) MESSAGING RELATIONSHIP UNIQUE IDENTIFIER SYSTEMS AND METHODS

(71) Applicant: MASTERCARD INTERNATIONAL INCORPORATED, Purchase, NY (US)

(72) Inventor: Rodney Victor Barlow Pye, Riverwoods, IL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 91 days.

(21) Appl. No.: 17/516,257

(22) Filed: Nov. 1, 2021

(65) Prior Publication Data

US 2022/0138228 A1    May 5, 2022

Related U.S. Application Data

(60) Provisional application No. 63/109,207, filed on Nov. 3, 2020.

(51) Int. Cl.
 G06F 16/28    (2019.01)
 G06F 16/22    (2019.01)
 (Continued)

(52) U.S. Cl.
 CPC ............ *G06F 16/285* (2019.01); *G06F 16/22* (2019.01); *G06F 16/245* (2019.01); *G06Q 20/386* (2020.05); *H04L 51/216* (2022.05)

(58) Field of Classification Search
 USPC ........................................................ 707/740
 See application file for complete search history.

(56) References Cited

U.S. PATENT DOCUMENTS 8,307,036 B2   11/2012   Kamat et al.
9,600,806 B2   3/2017   Baggett et al.
(Continued)

OTHER PUBLICATIONS

Nurzhan Zhumabekuly Aitzhan; Security and Privacy in Decentralized Energy Trading Through Multi-Signatures, Blockchain and Anonymous Messaging Streams IEEE Transactions on Dependable and Secure Computing, vol. 15, No. 5, Sep./Oct. 2018 (Year: 2018).*

(Continued)

*Primary Examiner* — Ann J Lo
*Assistant Examiner* — Jermaine A Mincey
(74) *Attorney, Agent, or Firm* — Armstrong Teasdale LLP

(57) ABSTRACT

A computer system that includes a database for storing a plurality of records, and an electronic message processing server. Each of the records corresponds to a respective message received by the server. The processor is programmed to store a first record of a first message in the database, the first record including a first message relationship unique identifier (MUI) as a tag. The first MUI corresponds to a first message family. The processor is also programmed to receive a second message, and execute a matching process. The processor is further programmed to store a second record of the second message, including, in response to a match of the second message to the first record, including the first MUI as a tag, and in response to the result indicating no match, generating a second MUI for the second message and including the second MUI as the tag on the second record.

16 Claims, 9 Drawing Sheets

(51) Int. Cl.
  *G06F 16/245* (2019.01)
  *G06Q 20/38* (2012.01)
  *H04L 51/216* (2022.01)

(56) References Cited

U.S. PATENT DOCUMENTS

| | | | |
|---|---|---|---|
| 10,325,599 B1* | 6/2019 | Naidu | H04L 51/02 |
| 10,936,638 B2 | 3/2021 | Salminen | |
| 11,032,223 B2 | 6/2021 | Sathi et al. | |
| 11,348,111 B2* | 5/2022 | Beck | G06Q 40/02 |
| 2002/0122543 A1 | 9/2002 | Rowen | |
| 2002/0138582 A1 | 9/2002 | Chandra et al. | |
| 2004/0057432 A1* | 3/2004 | Allen | H04L 12/4135 370/252 |
| 2007/0219794 A1* | 9/2007 | Park | G06Q 30/0613 704/246 |
| 2009/0150498 A1 | 6/2009 | Branda et al. | |
| 2009/0164506 A1 | 6/2009 | Barley et al. | |
| 2011/0029657 A1* | 2/2011 | Gueta | H04L 43/026 709/224 |
| 2013/0007164 A1 | 1/2013 | Kamat et al. | |
| 2015/0095429 A1 | 4/2015 | Gaines et al. | |
| 2018/0367495 A1* | 12/2018 | Kim | H04L 12/185 |
| 2020/0296070 A1 | 9/2020 | Volach | |
| 2020/0387902 A1* | 12/2020 | Rohlfing | G06Q 20/3676 |

OTHER PUBLICATIONS

Risto Vaarandi; A Data Clustering Algorithm for Mining Patterns From Event Logs;2003;IEEE; pp. 119-126 (Year: 2003).*

* cited by examiner

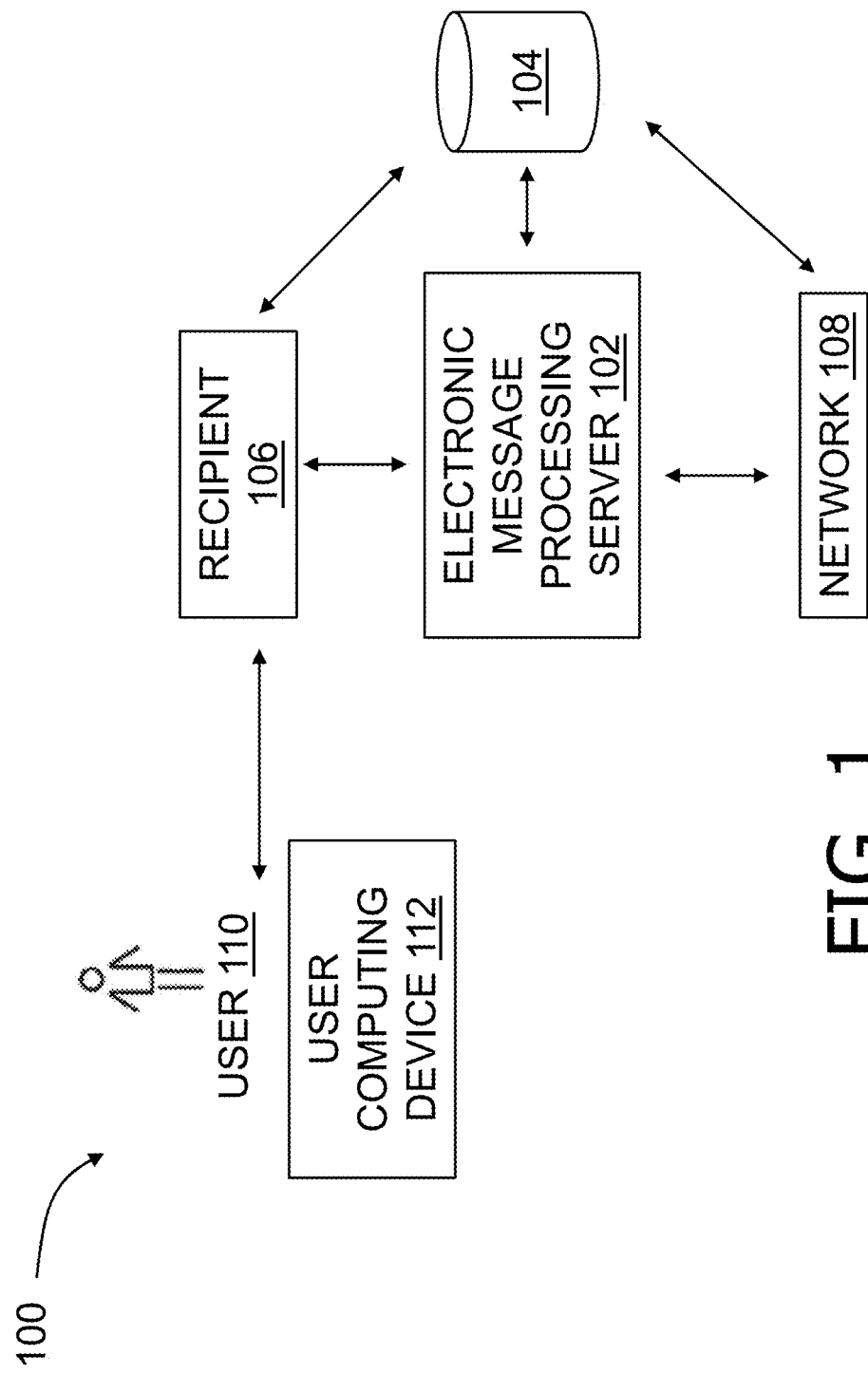

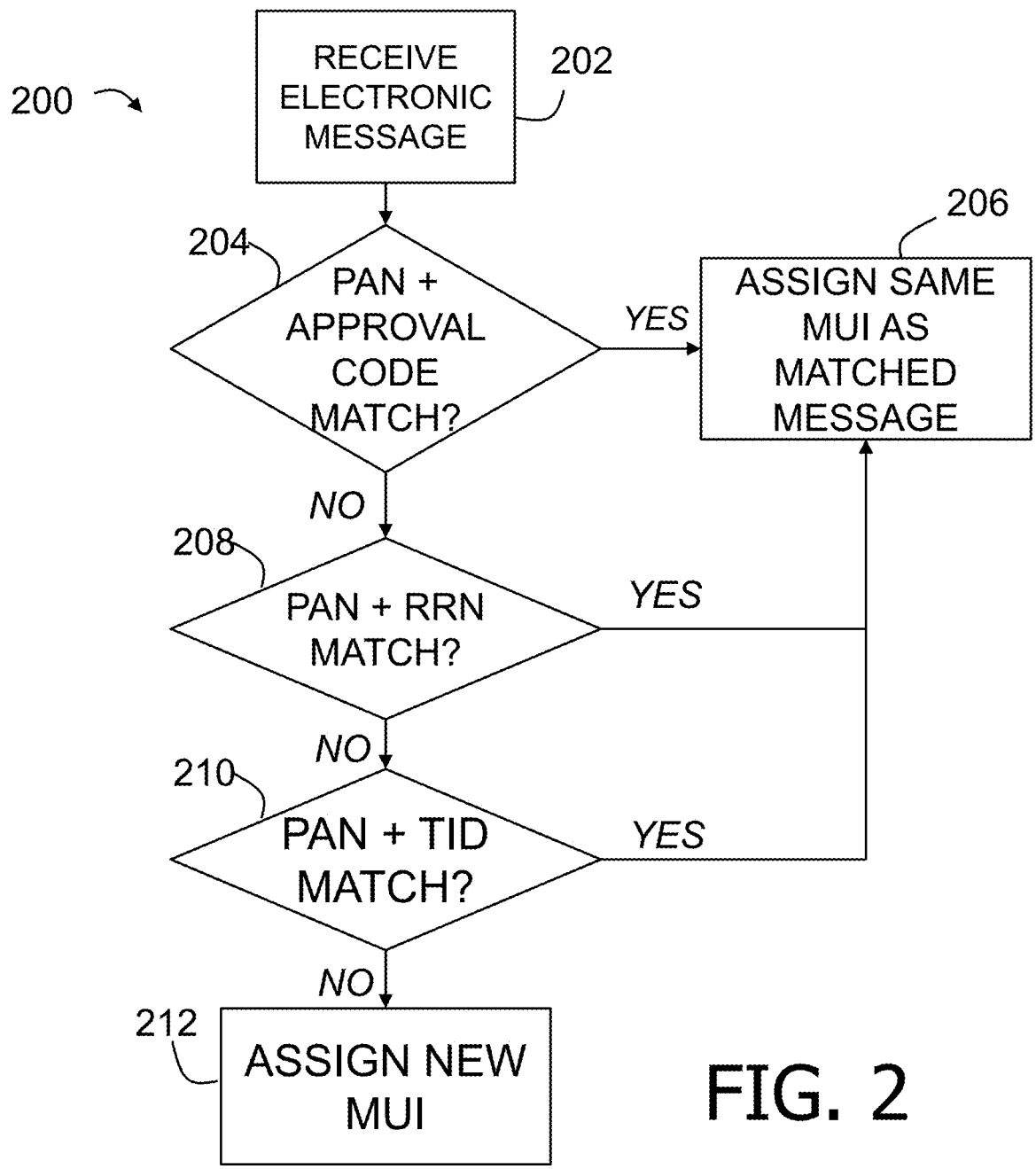

MESSAGING RELATIONSHIP UNIQUE IDENTIFIER SYSTEMS AND METHODS

CROSS REFERENCE TO RELATED APPLICATIONS

This application claims the benefit of, and priority to, U.S. Provisional Application No. 63/109,207 filed Nov. 3, 2020, the entire contents of which are hereby incorporated by reference in their entirety.

BACKGROUND

The field of the present disclosure relates generally to electronic data processing, and, more particularly, to network-based systems and methods for uniquely identifying related electronic messages using a messaging unique identifier (MUI) for matching distinct and related electronic messages.

As computers become more ubiquitous, electronic, computer-based messages—such as messages sent over the Internet, cellular messages, and other, more specific messaging protocols—are constantly being sent and received. Some related messages may be sent at different times and/or over different channels. Where these messages are distinct but are related, there may be a need to logically link these messages for a variety of purposes, such as, for example, later retrieval and/or analysis of a plurality of linked messages.

One environment in which multiple distinct electronic messages related to a common underlying event are routed over a network is in the payment processing industry. For example, when a person (e.g., a consumer) initiates an initial transaction with a payment card (e.g., a debit/credit card) associated with a payment account, an initial message representing that initial transaction is routed and processed over a payment processing network. Once the initial transaction is completed or authorized, a record of the initial message is stored by one or more parties to the transaction. There exist several circumstances under which subsequent messages, which are related to the initial transaction, are routed over the payment processing network, such as messages representing one or more partial refund transactions, one or more network or facility usage fee charges, one or more chargeback transactions, reversal transactions, and the like. Currently, the infrastructure of known payment processing networks does not support establishing relationships between such distinct message types as they are processed and stored. Moreover, even in the context of subsequent analysis of stored messages, there are no known methods for matching these distinct messages back to the initial transaction, other than manually searching a list of messages and attempting to match based upon message content such as the payment card account number, date, merchant identifier, and/or transaction amount of the initial transaction. This process can be difficult and consume substantial computational resources, in particular with respect to messages for payment cards or associated accounts used for a relatively high number of transactions per day.

BRIEF DESCRIPTION

In one aspect, a computer system is provided. The computer system includes a database configured to store a plurality of records and an electronic message processing server. The electronic message processing server includes a memory and a processor. Each of the records corresponds to a respective message received by the electronic message processing server via a network. The processor is programmed to store a first record of a first message in the database, the first record including a first message relationship unique identifier (MUI) as a tag added to content of the first message. The first MUI corresponds to a first message family. The processor is also programmed to receive a second message and execute a matching process that compares contents of the second message against the records in the database and returns a result. The processor is further programmed to store a second record of the second message in the database, including, in response to the result indicating a match of the second message to the first record, including the first MUI as a tag on the second record, and in response to the result indicating no match of the second message to any of the records, generating a second MUI for the second message and including the second MUI as the tag on the second record. The second MUI corresponds to a second message family.

In another aspect, a computer-implemented method for linking records using a message relationship unique identifier (MUI) is provided. The method is implemented using a database configured to store a plurality of records and an electronic message processing server that includes a processor and a memory. Each of the records corresponds to a respective message received by the electronic message processing server via a network. The method includes storing a first record of a first message in the database, the first record including a first message relationship unique identifier (MUI) as a tag added to content of the first message. The first MUI corresponds to a first message family. The method also includes receiving a second message and executing a matching process that compares contents of the second message against the records in the database and returns a result. The method further includes storing a second record of the second message in the database, including, in response to the result indicating a match of the second message to the first record, including the first MUI as a tag on the second record, or in response to the result indicating no match of the second message to any of the records, generating a second MUI for the second message and including the second MUI as the tag on the second record. The second MUI corresponds to a second message family.

In a further aspect, at least one non-transitory computer-readable storage medium having computer-executable instructions stored thereon is provided for execution by a processor of an electronic message processing server. The processor is in communication with a database configured to store a plurality of records, each of the records corresponding to a respective message received by the electronic message processing server via a network. The computer-executable instructions cause the processor to store a first record of a first message in the database, the first record including a first message relationship unique identifier (MUI) as a tag added to content of the first message. The first MUI corresponds to a first message family. The computer-executable instructions also cause the processor to receive a second message and execute a matching process that compares contents of the second message against the records in the database and returns a result. The computer-executable instructions further cause the processor to store a second record of the second message in the database, including, in response to the result indicating a match of the second message to the first record, including the first MUI as a tag on the second record, and in response to the result indicating no match of the second message to any of the records, generating a second MUI for the second message and including the second MUI as the tag on the second record. The second MUI corresponds to a second message family.

BRIEF DESCRIPTION OF THE DRAWINGS

FIGS. 1-7 show example embodiments of the methods and systems described herein.

FIG. 1 is a simplified schematic diagram of a message matching and tracking (MMT) system including an electronic message processing server.

FIG. 2 is a block diagram of message matching and assignment of message unique identifiers (MUI) using the MMT system shown in FIG. 1.

FIG. 5 is a schematic diagram of a server computing device that may be used in the MMT system shown in FIG. 1.

FIG. 6 is a schematic diagram of a user computing device that may be used in the MMT system shown in FIG. 1.

FIG. 7 is an example flow diagram for a method for linking message records using MUIs.

DETAILED DESCRIPTION

Figure 3A:
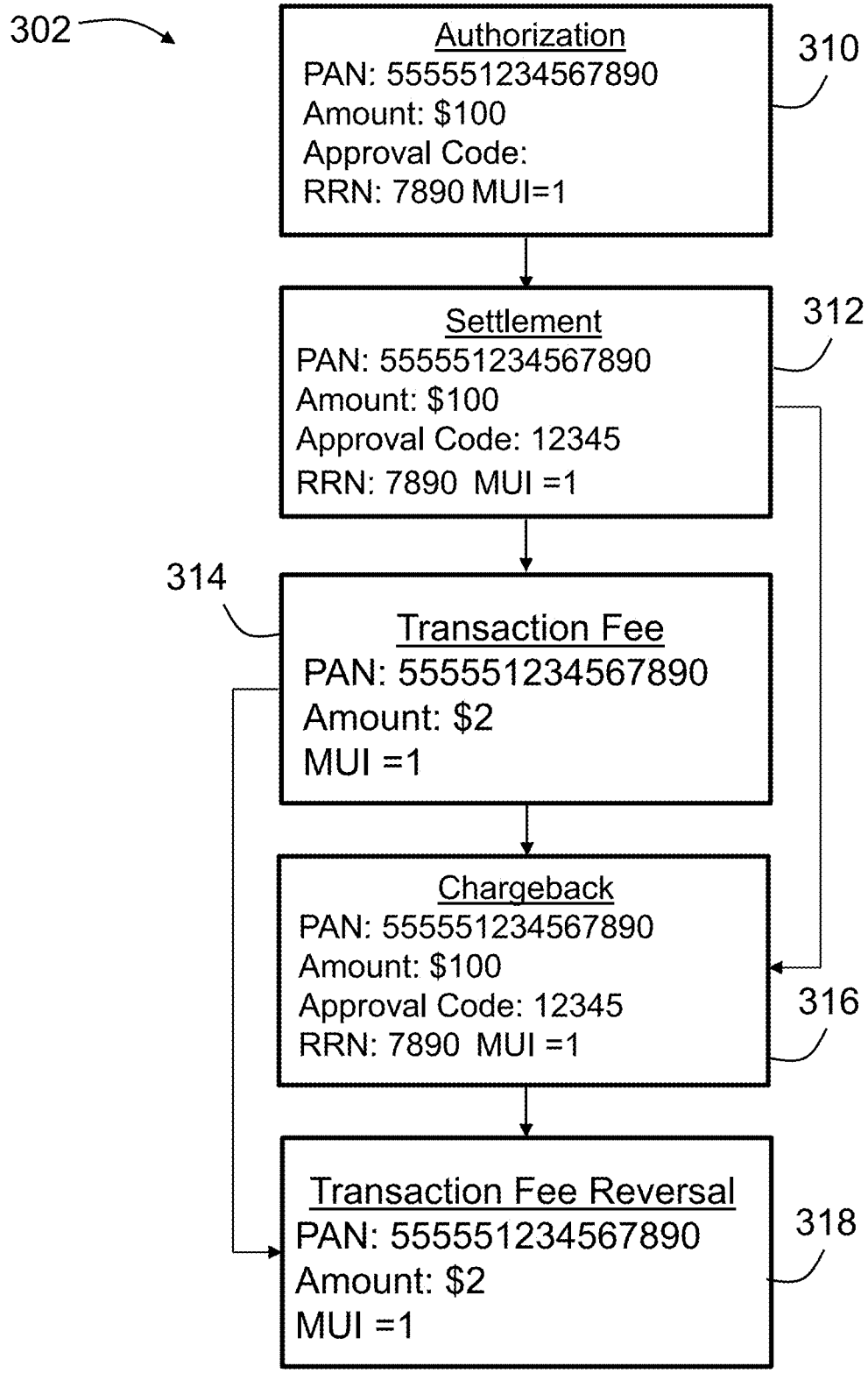
FIGS. 3A-3C depict message families including message records linked by assigned MUIs.

The systems and methods described herein are directed to generating unique identifiers that are associated with initial messages and subsequent, related messages, to enable linking related messages and forming a family of messages for subsequent analysis/retrieval.

As used herein, a "family of messages" (or "message family") is used to refer to an initial message routed over a network and any subsequent, related messages routed over the network. Messages are "related" when their content relates to the same underlying event. A family of messages may therefore include solely a single message—where only an initial message concerning the underlying event is routed over the network—or a plurality of related messages. Each message routed over the network may also be stored as a record in a database. Message family records, as described further herein, refer to the message records for all related messages within a family of messages. Message family records are identified by a message unique identifier (MUI) that is shared among all related message records (e.g., as a tag on each transaction record).

An "initial" message (also referred to as a base or parent message) refers to the chronologically first message within a message family. Subsequent messages may be referred to as "child" messages. The MUI disclosed herein is generated when an initial message is received.

For example, if the network routes conversational or other text-based messages between two or more parties, the underlying event may be the introduction of a new topic. For example, the topic may be parsed from a header or "subject line" field of the messages, or derived from a word frequency analysis of the textual content of the message. An initial message in a family may be identified as a message for which the topic (e.g., the most frequently used terms) does not match the topic of any existing records, and child messages are subsequent messages for which the parsed topic is a match to that of the initial record. An advantage of building a message family in this fashion is that subsequent messages do not require a consistent "subject line" and need not be initiated as a "reply" to the initial message in order to be recognized as part of the same message family.

In the example of messages routed over a payment processing network, the underlying event is typically a payment transaction initiated by using a credit card, debit card, prepaid card, etc., and the initial message is typically an authorization request message for the payment transaction. The underlying event may include, for example, a purchase of goods or services, an ATM withdrawal, a bill payment (e.g., one-time bill payment, recurring/subscription payment, etc.), or the like. In this context, child messages routed over the payment processing network and related to the same underlying event may represent reversals (i.e., return of funds used in the purchase to the issuer of the payment account), refunds (i.e., return of funds from the merchant to the payment account), chargeback requests (i.e., messages from the issuer requesting reversal of a disputed transaction), interchange fee assessments (i.e., fees charged to various parties for use of the payment processing network), ATM fee assessments (i.e., fees charged by the host and/or sponsoring bank for use of the ATM), and the like. In some embodiments, child messages may additionally represent clearing and/or settlement processes related to the underlying purchase transaction. Accordingly, in the payment processing network example, a message family encompasses a series of electronic messages that result from an initial payment transaction initiated between a consumer and merchant (or other payee), and that trace a life cycle or eventual outcome for various parties with a role in that initial payment transaction.

In some cases, such as in the payment processing example, an initial message may additionally or alternatively be recognized based on its type. More specifically, the initial message is typically in a standard format, as discussed in more detail herein, and includes a specific data element that identifies the message as an authorization request message, which identifies the initiation of a purchase using a payment account. Alternatively, any suitable method may be used to identify an initial message.

Upon identification of an initial message, a record of that initial message tagged with the newly generated, unique MUI is stored in a message database. As subsequent messages are received via the network, their content is compared against the content of existing messages in the database. If a stored record is found to have matching content according to suitable matching criteria, the MUI of the stored record is also assigned to a newly created record for the newly received message. The messages are thereby related, using the MUI, as part of the same message family. If no stored record is found to have matching content, the newly received message is assigned a new MUI and functions as an initial message for its own message family.

As set forth above, there is no known current message management architecture that enables such matching of logically related subsequent messages to an initial message or underlying event. Rather, a manual matching process must be performed by a human service provider, who attempts to match messages by matching specific details in the message content, such as subject line or word frequency in text-based messages, or in the case of a payment network, a primary account number (PAN) of the payment account used to conduct the initial transaction, a date of the initial transaction, an identifier of the merchant with which the initial transaction was conducted, or other specific data elements of the messages (e.g., a retrieval reference number assigned by the merchant or acceptor of the payment, an approval code assigned by the issuer of the payment account, etc.).

In the example embodiment, the MUI assignment and the subsequent matching processes are performed by a computing system of a single party. As used herein, an "electronic message processing server" is used to refer to this party or computing system. In the payment processing example, the electronic message processing server may include or be co-hosted by the servers of an issuer processor (i.e., a party that performs payment authorizations and related functions on behalf of an issuer). Alternatively, the electronic message processing server may include or be co-hosted by the servers of a payment processor (associated with a payment processing network) or another suitable party. In other embodiments, the MUI assignment and the subsequent matching processes may be performed by different parties.

Some examples disclosed in detail herein relate to electronic financial transaction messages. Specifically, the electronic message processing server may be configured to process electronic messaging for data exchange between financial institutions (e.g., authorization request messages, authorization response messages, etc.), formatted according to standards such as those described in ISO 8583 and ISO 20022. As used herein, "ISO" refers to a series of standards approved by the International Organization for Standardization (ISO is a registered trademark of the International Organization for Standardization of Geneva, Switzerland). ISO 8583-compliant messages are defined by the ISO 8583 standard which governs payment transaction card originated messages and further defines acceptable message types, data elements, and code values associated with such payment transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA). However, it is contemplated that the methods and systems of the present disclosure are equally applicable to other electronic messages and/or messaging formats for which matching and family/related-message tracking is needed or useful.

The MUI described herein may be any suitable identifier. In some embodiments, the MUI includes a universally unique identifier (UUID), which is a 128-bit number represented in textual format displayed in 5 groups separated by hyphens for a total of 36 characters (i.e., 32 alphanumeric characters and 4 hyphens). An example UUID may appear as: 123e4567-e89b-12d3-a456-426655440000. In some embodiments, additional data may be added to the UUID, as prefix or suffix, to form the MUI and to identify additional attributes or intelligence, such as the particular device or system that generated that particular MUI value, when it was generated, the type of initial message, and/or any other data. Alternatively, the MUI is formatted in any suitable way.

At least one technical problem to be solved by the systems and methods provided herein includes: (i) inability to identify and/or link related messages as the messages are received and processed by an electronic message processing server, (ii) inability to tag records for related messages to indicate the relationship during initial storage of the records, (iii) inability to automatically and efficiently retrieve related messages and/or message family life cycles in response to a query for additional information based on contents of a single message of interest, and (iv) need for dedicated computer-executable application and processing resources to enable an operator to manually enter queries on large numbers stored electronic records, and to review the results to manually identify related messages within the results.

The technical effect of the systems and processes described herein may achieved by performing at least one of the following steps: i) storing a first record of a first message in a database, the first record including a first message relationship unique identifier (MUI) as a tag added to content of the first message, wherein the first MUI corresponds to a first message family; ii) receiving a second message and executing a matching process that compares contents of the second message against the records in the database and returns a result; iii) storing a second record of the second message in the database, including, in response to the result indicating a match of the second message to the first record, including the first MUI as a tag on the second record, and in response to the result indicating no match of the second message to any of the records, generating a second MUI for the second message and including the second MUI as the tag on the second record, wherein the second MUI corresponds to a second message family.

The systems and methods disclosed herein solve the above-referenced technical problems at least by providing a specialized computing device (i.e., an electronic message processing server) within the architecture of the network. For example, the electronic message processing server is implemented as part of an issuer processor computing system, or alternatively as part of a payment processing network server system or other computing system connected to the network. The electronic message processing server has access to all incoming messages routed to the hosting party, and is thereby enabled to analyze the incoming messages and match them, where applicable, to previous, related messages. The electronic message processing server generates message records that link these related messages using a shared MUI, such that an entire family of messages related to the same underlying event can be identified and retrieved using the single shared MUI. A technical effect or improvement provided by the systems and processes described herein include at least one of: (i) automated identification of incoming messages, as they are received, as related to a common underlying event with respect to one or more previously stored message records, thereby improving a speed of identifying message family life cycles; (ii) automatic linking, during initial storage, of records for incoming messages as related to a common underlying event using a shared MUI that acts as a tag on stored transaction records, thereby eliminating computational resources otherwise needed for post hoc retrieval, analysis, and modification of large numbers of previously stored records to identify and/or tag such relationships, (iii) retrieval of a message family using a shared MUI common to message records for a common underlying event, thereby improving a speed of, and reducing computational resources needed for, responses to queries for additional information based on contents of a single message; and (iv) elimination of computational resources needed for dedicated computer-executable application to enable an operator to manually enter queries on large numbers stored electronic records, and to review the results to manually identify related messages within the results.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a non-transitory computer readable medium. In an example embodiment, the functions of the electronic message processing server are executed on a single computer system. In another example embodiment, the electronic message processing server includes multiple components distributed among a plurality of computing devices. One or more components may be in the form of computer-executable instructions embodied in a computer-readable medium. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The implementation is flexible and designed to run in various different environments without compromising any major functionality. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. Although many of the embodiments described herein relate to payment processing networks, it is contemplated that the disclosure has general application to processing electronic messages related to a common underlying event in many different environments and messaging contexts.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example embodiment of a message matching and tracking (MMT) system 100 in accordance with the present disclosure. MMT system 100 includes, in the example embodiment, an electronic message processing server 102 in communication with a database or memory 104. Electronic message processing server 102 generates message records for messages routed to a recipient 106 by a network 108, and stores these records in database 104 for later retrieval. Each message record includes a MUI, assigned to the corresponding message according to the processes described herein. Electronic message processing server 102 may include or be integral to or otherwise associated with a computing system of recipient 106, or alternatively may include or be integral to or otherwise associated with network 108 (e.g., a network routing switch). Electronic message processing server 102 is configured to perform message matching and MUI assignment processes described in greater detail herein.

In some embodiments, recipient 106 authorizes payments on behalf of an issuer of payment accounts to users (also referred to as cardholders, consumers, etc.), such as a user 110, and network 108 represents a payment processing network that routes and processes messages according to a set of proprietary communications standards for the exchange of financial transaction data and the settlement of funds between financial institutions. In such embodiments, network 108 is configured to process payment/purchase transactions for a plurality of cardholders with a plurality of merchants, by transmitting various authorization request and response messages between parties to the transaction (e.g., the merchant, the merchant's acquirer, and an issuer). As used herein, "payment processing network" refers broadly to the network and/or to one or more computing devices associated therewith (e.g., payment processors or payment processing computing devices).

In at least some instances, user 110 (e.g., a cardholder) may access message records, linked via a MUI, from electronic message processing server 102. For example, user 110 may contact the issuer (represented by recipient 106) of a payment card used by user 110 (e.g., via a phone call or a web browser or other software application executed on a user computing device 112) to inquire about a payment transaction (e.g., a purchase from a merchant, an ATM withdrawal, a bill payment) attributed to user 110 on an issuer billing statement or computer-accessible interface. The billing statement or other interface provides information sufficient to link the transaction to an initial message (e.g., an authorization request message) received by recipient 106 via network 108. In a conventional system, however, there would be no direct link to other messages associated with the same underlying event (here, the payment transaction). Such other messages may represent, for example, a subsequent full or partial refund of the purchase price, ATM fee assessments (i.e., fees charged by the host facility and/or sponsoring bank for use of the ATM), chargeback requests based on a previous dispute of the payment transaction by user 110, etc. Using embodiments of the present disclosure, a computing system of recipient 106 is configured to automatically retrieve all message records associated with the same underlying event from database 104 using the MUI associated with the initial message. Therefore, the system of the present disclosure enables faster and more efficient access to (and, in some cases, analysis of) related message records, because related messages are already linked in database 104 by the MUI. Recipient 106 may have direct electronic access to database 104 such that the computing system of recipient 106 may access message records stored therein directly. Additionally or alternatively, the computing system of recipient 106 may communicate with electronic message processing server 102 to access database 104.

In the example embodiment, electronic message processing server 102 performs a matching process on all incoming messages from network 108, to determine whether each incoming message matches any message records stored in database 104. If there is no match, electronic message processing server 102 may determine that the incoming message is an initial message in a new message family. Electronic message processing server 102 may receive the incoming electronic messages directly from network 108, or indirectly from network 108 via another computing system of recipient 106. Electronic message processing server 102 may receive these electronic messages individually in real-time (e.g., within ten seconds), or near-real-time (e.g., within a few minutes), as they are routed from network 108. Alternatively, electronic message processing server 102 may receive the electronic messages periodically, such as in batches, either in near-real-time or on any suitable delayed basis. Electronic message processing server 102 performs the matching process by comparing contents of the incoming electronic message to elements of message records that are stored in database 104. Message records may be copies of, or otherwise include data values extracted from, historical electronic messages (i.e., electronic messages previously routed to recipient 106 via network 108), and may include additional data elements, such as a MUI.

As part of the matching process, electronic message processing server 102 parses the content of the incoming message for individual data elements, referred to as "matching criteria," that facilitate matching with the stored message records. In the context of electronic financial transaction messages (such as authorization messages, clearing/settlement messages, chargeback messages, refund/reversal messages, interchange fee messages, ATM fee messages, and the like), these data elements may include data elements specific to ISO 8583 or ISO 20022 messages; for example, a PAN (e.g., data element (DE) 2), a retrieval reference number (RRN, DE 37), an approval code (DE 38), and a transaction identifier (e.g., a MASTERCARD BANKNET ID, a VISA transaction ID, etc.). In some messages, the PAN is a tokenized PAN or device PAN (DPAN). In some embodiments, such as where electronic message processing server 102 is implemented by computing systems of an issuer processor as recipient 106, electronic message processing server 102 may access a mapping table or other electronic data structure that maps a tokenized PAN/DPAN to an original PAN. Alternatively, electronic message processing server 102 may continue processing using the tokenized PAN/DPAN, including generating and storing message records including the tokenized PAN/DPAN in the PAN data field. Other matching criteria may include, for example, a merchant identifier, an acquirer identifier, a transaction amount, a transaction date/time, or any other suitable data element. In the context of other types of electronic messages, the matching criteria may include other data elements, such as a sender identifier, a recipient identifier, a device identifier, a location identifier, and/or any other suitable matching criteria.

Electronic message processing server 102 then automatically filters or queries the stored message records using the matching criteria parsed from the incoming message. If no stored record has matching content in data fields corresponding to the matching criteria, electronic message processing server 102 generates a new, unique MUI and assigns that MUI to the incoming electronic message. In other words, the incoming electronic message represents an initial message in a new message family. In the payment processing example, an initial message may additionally or alternatively be recognized based on its type. For example, messages in the ISO 8583 format include a message type indicator (MTI). The MTI may indicate that the incoming message is of a type that is not associable with records of previously received messages. One such type is an initial submission of an authorization request message from a merchant or other payment acceptor, which corresponds to a new payment transaction as an underlying event. In response to the parsed content indicating an initial submission of an authorization request message, performing the matching process may include electronic message processing server 102 automatically generating a new, unique MUI and assigning that MUI to the incoming electronic message without filtering or querying the stored message records. Alternatively, electronic message processing server 102 also filters or queries the stored message records to obtain confirmation that the incoming message corresponds to a new message family. Other suitable methods may be used to identify an initial message for other messaging protocols or in other contexts.

If a stored record has matching content in data fields corresponding to the matching criteria, electronic message processing server 102 automatically assigns the MUI of the stored record to the incoming message. In other words, if the filter/query result returns at least one matching message record, the incoming electronic message is considered to be related to the same underlying event, and thus the same message family, as the at least one matching message record. Electronic message processing server 102 extracts the existing MUI from the at least one matching message record, and assigns the same existing MUI to the incoming electronic message. In the payment processing network example, the match indicates that the incoming electronic message is related to the same original payment transaction as the matching message record(s). For example, the incoming message represents a clearing message, a settlement message, a chargeback request message, a refund/reversal message, an interchange fee message, or an ATM fee message for the initial payment transaction.

Accordingly, electronic message processing server 102 implements automated identification of incoming messages, as they are received, as related to a common underlying event with respect to one or more previously stored message records, thereby improving a speed of identifying message family life cycles.

After a MUI has been assigned, electronic message processing server 102 generates a message record for the incoming message and stores the new message record in database 104, where it is available for use in the matching process against subsequently received incoming messages. The message record includes at least a subset of the content of the incoming electronic message, including at least the matching criteria, such that the message record may be referenced, parsed, and/or otherwise analyzed in subsequent matching processes. The message record also includes the MUI assigned to the message. The message record may further include additional suitable data elements apart from the MUI and the content of the incoming electronic message.

Accordingly, electronic message processing server 102 implements automatic linking, during initial storage, of records for incoming messages as related to a common underlying event using a shared MUI that acts as a tag on stored transaction records, thereby eliminating computational resources otherwise needed for post hoc retrieval, analysis, and modification of large numbers of previously stored records to identify and/or tag such relationships.

FIG. 2 is a flow diagram showing one example embodiment of an electronic message matching and MUI assignment process 200 performed by electronic message processing server 102, in the context of a payment processing network. In this embodiment, electronic message processing server 102 receives an incoming electronic message in a format compliant with ISO 8583 (step 202). Electronic message processing server 102 parses the received message for the matching criteria including a PAN (DE 2) and an approval code (DE 38) and determines whether the PAN (DE 2) and the approval code (DE 38) from the received message match a PAN and approval code of any existing message record stored in database 104 (step 204). If no match is found, or if the approval code (DE 38) cannot be parsed from the received message, process 200 proceeds with step 208, as described below. If at least one matching message record is identified from database 104, electronic message processing server 102 assigns the existing MUI from the matching record(s) to the received message and stores a message record for the received message, including the assigned MUI (step 206).

At step 208, electronic message processing server 102 parses the received message for additional matching criteria including a retrieval reference number (RRN) (DE 37) and determines whether the PAN (DE 2) and the RRN (DE 37) from the received message match a PAN and RRN of any existing message records stored in database 104. If at least one matching message record is identified from database 104, electronic message processing server 102 proceeds with step 206, as described above. If no match is identified, process 200 proceeds with step 210.

At step 210, electronic message processing server 102 parses the received message for additional matching criteria including a transaction ID (TID) and determines whether the PAN (DE 2) and the transaction ID from the received message match a PAN and transaction ID of any existing messages/records stored in database 104. For example, the transaction ID may be located in a suitable data element and have a value assigned by network 108. If at least one matching message record is identified from database 104, electronic message processing server 102 proceeds with step 206, as described above. If no match is identifier, process 200 proceeds with step 212.

Although steps 204, 208, and 210 are described as separate parsing operations for various fields of the received message in steps 204, 208, and 210, it should be understood that all data fields contemplated for use in any step of the matching process may be parsed from the received message in a single parsing operation.

At step 212, electronic message processing server 102 generates a new MUI and assigns the new MUI to the received message. Electronic message processing server 102 then stores a message record for the received message, including the assigned MUI, in database 104.

It is contemplated that electronic message processing server 102 may perform alternative and/or additional matching processes. For example, in some embodiments, as described above, certain types of electronic messages are defined or understood to be initial messages, i.e., not associable with records of previously received messages. For example, an authorization request message may be understood to always represent an initial message, and may be identified as an authorization request message based on the existence or value of one or more data elements thereof. In some embodiments, electronic message processing server 102 is configured to recognize such electronic message types and automatically assign a new MUI thereto. That is, electronic message processing server 102 skips steps 204-210 and proceeds directly to step 212 upon determining that an incoming electronic message is of a type that is defined as an initial transaction/message, thereby conserving processing resources.

Figures 3B, 3C:
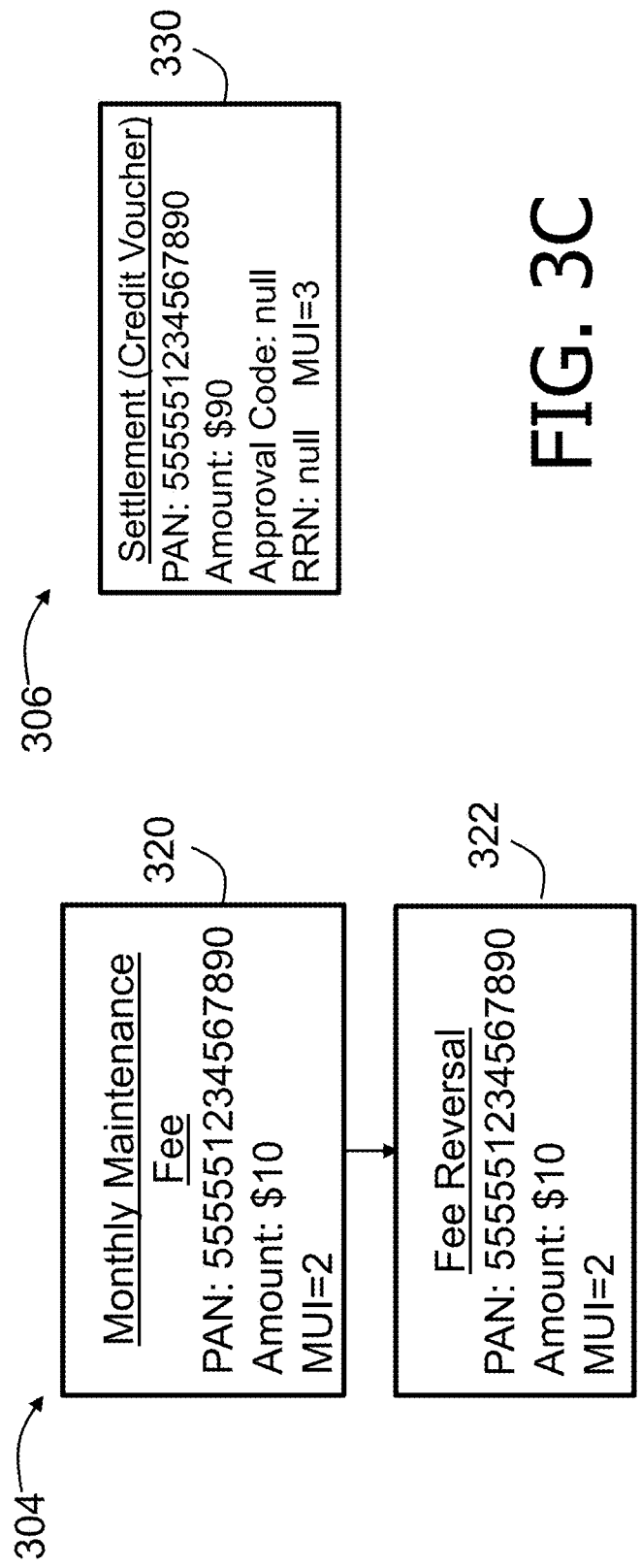

Several examples of message families resulting from various implementations of process 200 are shown in FIGS. 3A-3C. In particular, FIGS. 3A-3C depict respective message families 302, 304, 306—represented by stored transaction records linked by a shared TRUI. Each message family corresponds to a comprehensive transaction history associated with an initial transaction processed over network 108.

In a first example, as depicted in FIG. 3A and with reference also to FIG. 1, a cardholder (e.g., user 110) proffers a payment account to a merchant point-of-sale device (e.g., by swiping a transaction card or by activating a digital wallet application on a mobile phone) for in-store purchase of $100. In response, the POS device transmits an authorization request message associated with the purchase to network 108 for authorization of the payment by recipient 106 (in this case, the issuer processor of the payment account). Electronic message transaction processing server 102 also receives the authorization request message as an incoming electronic message, and performs the above-described matching process. Electronic message processing server 102 determines the authorization request message is an initial message, by recognizing the message type and/or by determining that the message contents do not match any existing message record in database 104. Electronic message processing server 102 assigns a unique MUI value to that message. For simplicity, the MUI is illustrated as MUI=1, however, it should be recognized that the MUI may be a more complex value, such as a universally unique identifier (UUID) as discussed above. Electronic message processing server 102 generates and stores in database 104 a message record 310 for that authorization request message. In this example, message record 310 includes values for the PAN, transaction amount, RRN, and any other suitable values (e.g., time/date stamp) from the authorization request message, as well as the assigned MUI value.

In response to the authorization request message, recipient 106 determines that the payment account is in good standing and has sufficient funds to cover the purchase. Therefore, recipient 106 sends an authorization response message (not shown for brevity) back to the merchant POS via network 108, authorizing the payment from the payment account. The authorization response message maintains the values of the authorization request message and adds values in additional data fields, including an approval code generated by recipient 106.

Thereafter, electronic message processing server 102 receives another incoming electronic message, with content corresponding to settlement of funds for the $100 purchase transaction. Electronic message processing server 102 performs a matching process against the records of database 104 as described herein, and determines that the settlement message is a match with message record 310. For example, the matching process matches a PAN, transaction amount, and/or RRN parsed from the settlement message to the PAN, transaction amount, and/or RRN from transaction record 310. In response to the match, electronic message processing server 102 parses the MUI value from message record 310 and assigns the same MUI value to the settlement message. Electronic message processing server 102 generates and stores in database 104 a transaction record 312 for the settlement message. In this example, message record 312 includes the PAN, transaction amount, approval code, and RRN from the settlement message, as well as the assigned MUI value copied from record 310.

In some embodiments, electronic message processing server 102 may receive a supplemental message, such as a transaction fee message, with content corresponding to an additional fee associated with the $100 transaction. Electronic message processing server 102 again performs a matching process against the records of database 104 as described herein, and determines that the settlement message is a match with message records 310 and/or 312. In some such embodiments, electronic message processing server 102 is programmed to recognize, as a property of network 108, that any transaction fee message is received substantially simultaneously with a corresponding settlement message. Therefore, the matching criteria applied to a transaction fee message may include matching to a settlement message with a substantially equal time/date stamp. Additionally or alternatively, electronic message processing server 102 may apply any suitable matching criteria to match the supplemental message with the message family 302. In response to the match, electronic message processing server 102 parses the MUI value from message record 310 and/or 312 and assigns the same MUI value to the settlement message. Electronic message processing server 102 generates and stores in database 104 a message record 314 for the supplemental message. In this example, message record 314 includes data field values from the transaction fee message, as well as the assigned MUI value copied from record 310 or 312.

Some time later, the $100 purchase may disputed by the cardholder, e.g., directly with the merchant and/or through a chargeback request from the issuer, and potentially reversed. In one such example, electronic message processing server 102 receives another incoming electronic message with content corresponding to a chargeback request associated with the return of funds in the original purchase amount ($100.00) to the payment account. Electronic message processing server 102 again performs a matching process against the records of database 104 as described herein, and determines that the chargeback request message is associated with message family 302. For example, the matching process matches a PAN, approval code, transaction (chargeback) amount, and/or RRN from the chargeback message to the PAN, approval code, transaction amount, and/or RRN from message record 310 and/or message record 312. In response to the match, electronic message processing server 102 parses the MUI value from message record 310, 312, and/or 314 and assigns the same MUI value to the chargeback request message. Electronic message processing server 102 generates and stores in database 104 a message record 316 for the chargeback request message. In this example, message record 316 includes data field values copied from the chargeback request message, as well as the assigned MUI value.

As before, electronic message processing server 102 may receive a supplemental message with the chargeback request message, with content corresponding to a transaction fee reversal message, indicating reversal of the additional fee previously issued for the initial transaction. In some such embodiments, electronic message processing server 102 is programmed to recognize, as a property of network 108, that any transaction fee reversal message is received substantially simultaneously with a corresponding chargeback request message. Therefore, the matching criteria applied to a transaction fee reversal message may include matching to a chargeback request message with a substantially equal time/date stamp. Additionally or alternatively, electronic message processing server 102 may apply any suitable matching criteria to match the supplemental message with the message family 302. In response to the match, electronic message processing server 102 parses the MUI value from message record 310, 312, 314, and/or 316 and assigns the same MUI value to the transaction fee reversal message. Electronic message processing server 102 generates and stores in database 104 a message record 318 for the transaction fee reversal message. In this example, message record 318 includes data field values copied from the transaction fee reversal message, as well as the assigned MUI value.

In a second example, as depicted in FIG. 3B, a card program is configured to assess a monthly fee of $10 based on behavior of an owner of the account (e.g., user 110). When this fee is assessed, electronic message processing server 102 receives an incoming electronic message, with content corresponding to a fee assessment message. Electronic message processing server 102 is programmed to recognize the fee assessment message type as an initial message based on its type, as discussed above, and/or performs a matching process against the records of database 104 and determines the fee assessment message does not match any existing message/record in database 104. In response, electronic message processing server 102 assigns a unique MUI value to that fee assessment (e.g., MUI=2). Electronic message processing server 102 generates and stores in database 104 a message record 320 for that fee assessment message. In this example, message record 320 includes the PAN and fee amount from the fee assessment message, as well as the MUI value.

Where this fee is assessed based on certain cardholder behavior, the fee may be later waived or reversed based on corrective cardholder behavior. When this fee is reversed, electronic message processing server 102 receives an electronic message with content corresponding to a fee reversal message. Electronic message processing server 102 again performs a matching process against the records of database 104 as described herein, and determines that the fee reversal message matches record 320. For example, the matching process matches a PAN and a fee (reversal) amount from the fee reversal message to the PAN and fee (assessment) data fields from message record 320. In response to the match, electronic message processing server 102 parses the MUI value from message record 320 and assigns the same MUI value to the fee reversal message. Electronic message processing server 102 generates and stores in database 104 a transaction record 322 for the fee reversal message. In this example, message record 322 includes the PAN and fee (reversal) amount from the fee reversal message, as well as the assigned MUI value copied from transaction record 320.

In a third example, as depicted in FIG. 3C, certain vouchers are extended to cardholders from an issuer and/or a merchant. In some cases, these vouchers are not identified in the traditional authorization messaging protocol, but rather are identified to the issuer of a payment card in a batch feed (e.g., from network 108). Electronic message processing server 102 may receive such a batch feed and parse individual voucher transactions therefrom. Electronic message processing server 102 may be configured to automatically recognize these types of messages as initial transactions, as described above, or may perform a matching process against the records of database 104 as described herein. Upon determining that the message is not part of an existing message family, electronic message processing server 102 assigns a unique MUI value to that voucher message (e.g., MUI=3). Electronic message processing server 102 generates and stores in database 104 a message record 330 for that voucher message. In this example, message record 330 includes the PAN and transaction amount from the voucher transaction, as well as the assigned MUI value. Message record 330 may also include "null" indicators for other fields associated with the traditional payment network messaging protocol, such as the approval code field and/or the RRN field.

In some embodiments, electronic message processing server 102 enables user 110 to receive information associated with all messages in a message family (e.g., message family 302, 304, 306). As described above, user 110 may contact an issuer of the user's payment account (i.e., recipient 106), which may provide direct access to electronic message processing server 102, such as through an app on user computing device 112, or indirect access to electronic message processing server 102, such as via a customer service representative over the phone. User 110 may identify any message in a message family and/or input (or otherwise provide) the MUI to access the message family records. Although the MUI has been described as including, for example, a 36-character alphanumeric identifier, in some embodiments, the MUI may be provided to a user 110 in a simplified, truncated, or tokenized format. For instance, user 110 may identify a message within an app on their phone (e.g., an initial purchase transaction for which they wish to review the partial return transaction history). Electronic message processing server 102 may provide the MUI for that transaction—and the related messages in the message family—as a six- or eight-digit alphanumeric identifier, which then may be selected, input (e.g., in another field or on another page), or provided (e.g., to a customer service representative) to access the rest of the message family. Electronic message processing server 102 receives this user input and performs a lookup in database 104 based on the user input (e.g., a message identifier or MUI). Database 104 returns records associated with the entire related message family, which electronic message processing server 102 then returns to user 110. In the example of FIG. 3A, user 110 would therefore receive message records 310, 312, 314, 316, and 318 (and/or information therefrom), either directly via the app or indirectly via the customer service representative.

According to the present disclosure, in the payment processing network example, electronic message processing server 102 is configured to process messages associated with virtually any transaction or message type associated with financial transactions, including the above examples as well as any purchase, payment, subscription/recurring transaction, fee assessment, clearing/settlement, dispute, reversal, chargeback, withdrawal, deposit, credit, debit, currency exchanges, or any other transaction type supported by the network 108 within the life cycle of a message family. Other types of related messages linked as part of a message family by a common MUI may include, for example and without limitation: (i) a withdrawal of funds (cash) from a checking account via an ATM and a transaction fee assessment for use of the ATM; (ii) a withdrawal of funds from a credit account and a cash-advance fee assessment, as well as any subsequent re-payment transactions and/or interest fee assessments; (iii) a purchase transaction for a purchase amount and one or more partial reversal transactions for less than entire purchase amount, as well as any subsequent clearing/settlement messages; (iv) a purchase transaction, a transaction fee associated with the purchase, one or more partial reversal transactions, and one or more partial transaction fee reversals associated with the partial reversal transactions; and/or (v) a purchase transaction made on a pre-paid card and a transaction fee associated with use of the pre-paid card issued to that pre-paid card.

Electronic message processing server 102 may be further configured to implement or enable fraud detection techniques using an assigned MUI within a message family. For example, a message family, linked by a MUI, can be more readily retrieved by electronic message processing server 102 for analysis by a fraud audit or detection analyst (e.g., for friendly fraud or for transactions with illogical chronology).

Figure 4A:
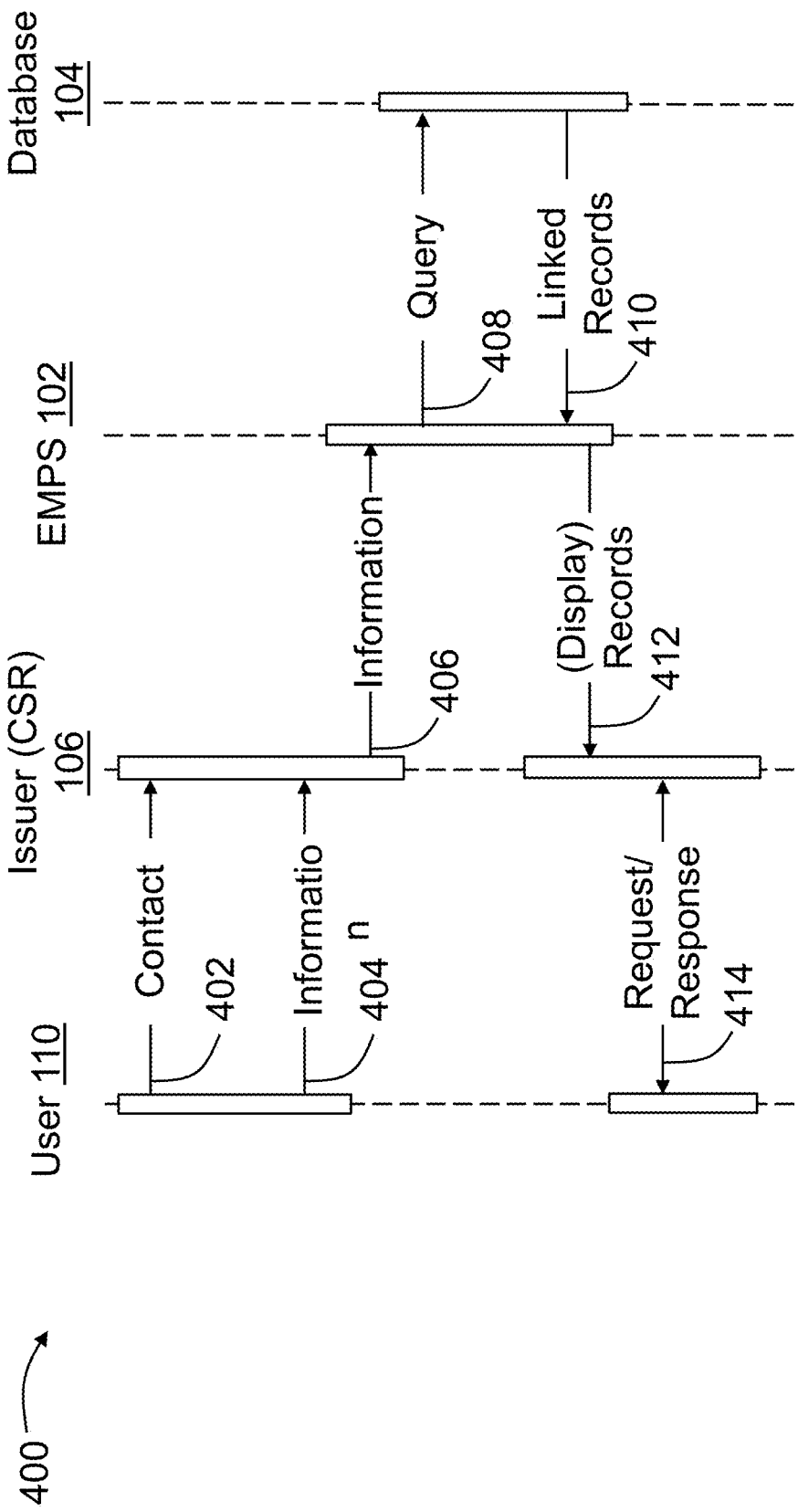
FIGS. 4A and 4B are swimlane diagrams illustrating message record retrieval using the MMT system shown in FIG. 1.
Figure 4B:
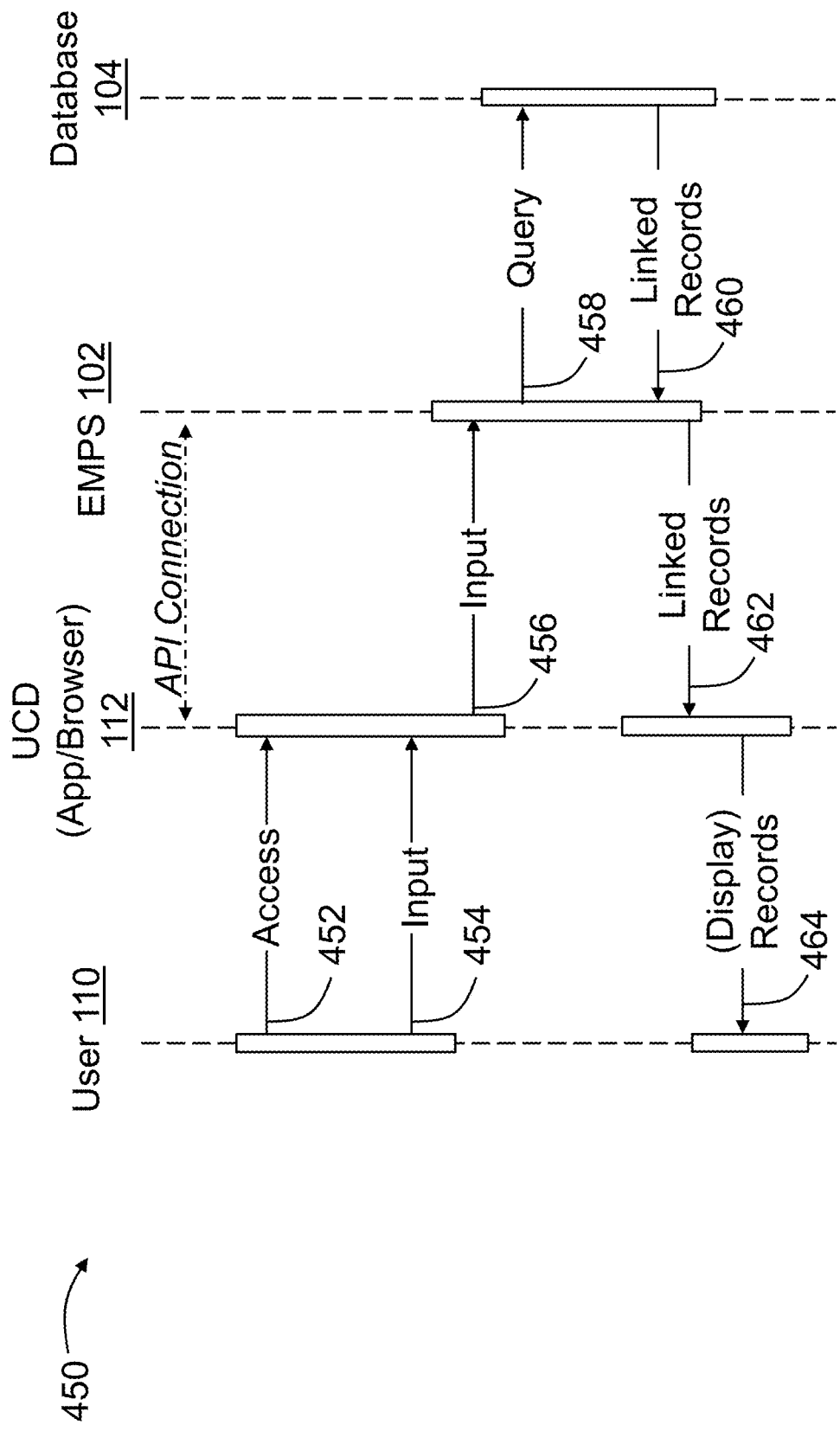

FIGS. 4A and 4B are swimlane diagrams depicting access to message family records, for example, by user 110 (shown in FIG. 1). More particularly, FIG. 4A is a swimlane diagram 400 of indirect access via a customer service representative (CSR) of issuer 106 (also shown in FIG. 1), and FIG. 4B is a swimlane diagram 450 of direct access via an app (or web browser) executed on user computing device 112 (also shown in FIG. 1).

Turning to FIG. 4A, and with reference also to FIG. 1, user 110 contacts (402) their issuer (recipient) 106, for example, over the phone (which may include user computing device 112 or another telephonic device). Issuer 106 is represented by a customer service representative (CSR). User 110 provides (e.g., speaks) (404) information to the CSR to identify a transaction and/or transaction history of interest. User 110 may provide identifying information for a transaction (e.g., time/date, merchant name, amount, etc.), or transaction history. For example, the user's billing statement or an issuer interface application provides a MUI for the transaction or other information sufficient to link the transaction of interest to at least one message. The CSR has access (e.g., via a computing device) to electronic message processing server 102, and provides (406) the information obtained from user 110, identifying the transaction/transaction history of interest, to electronic message processing server 102. Electronic message processing server 102 formats the received information into a database query with matching criteria, and submits (408) the query to database 104. Database 104 returns (410) any matching message records—specifically, a message record directly corresponding to the user's parameters, as well as message family records linked by a common MUI to the specified record, as assigned by electronic message processing server 102—to electronic message processing server 102. Electronic message processing server 102 transmits (412) (e.g., causes display of) the transaction records to the CSR. The CSR then communicates (414) with user 110 any relevant or requested information.

Turning now to FIG. 4B, user 110 accesses (452) their user computing device 112 (e.g., smartphone, laptop, desktop, tablet, etc.). In the example embodiment, user computing device 112 is communicatively coupled to electronic message processing server 102 via an API connection, which may be accessible to user 110 via an app or a web browser. In some cases, the app or web browser may include an issuer environment, such as a banking app or website, maintained by recipient 106. User 110 inputs (454) information to user computing device 112 to identify a transaction and/or transaction family of interest. User 110 may provide identifying information for a transaction (e.g., time/date, merchant, amount, etc.), or may provide a MUI for the transaction family. For example, the user's billing statement or the banking app provides a MUI for the transaction or other information sufficient to link the transaction of interest to at least one message. User computing device 112 transmits (456) the user input, identifying the transaction/transaction family of interest, to electronic message processing server 102. Electronic message processing server 102 formats the received information into a database query, and submits (458) the query to database 104. Database 104 returns (460) any matching transaction records—specifically, a message record directly corresponding to the user's parameters, as well as message family records linked by a common MUI to the specified record, as assigned by electronic message processing server 102—to electronic message processing server 102. Electronic message processing server 102 transmits (462) the transaction records to user computing device 112. User computing device 112 then displays (464) any relevant or requested information to user 110.

Figure 5:
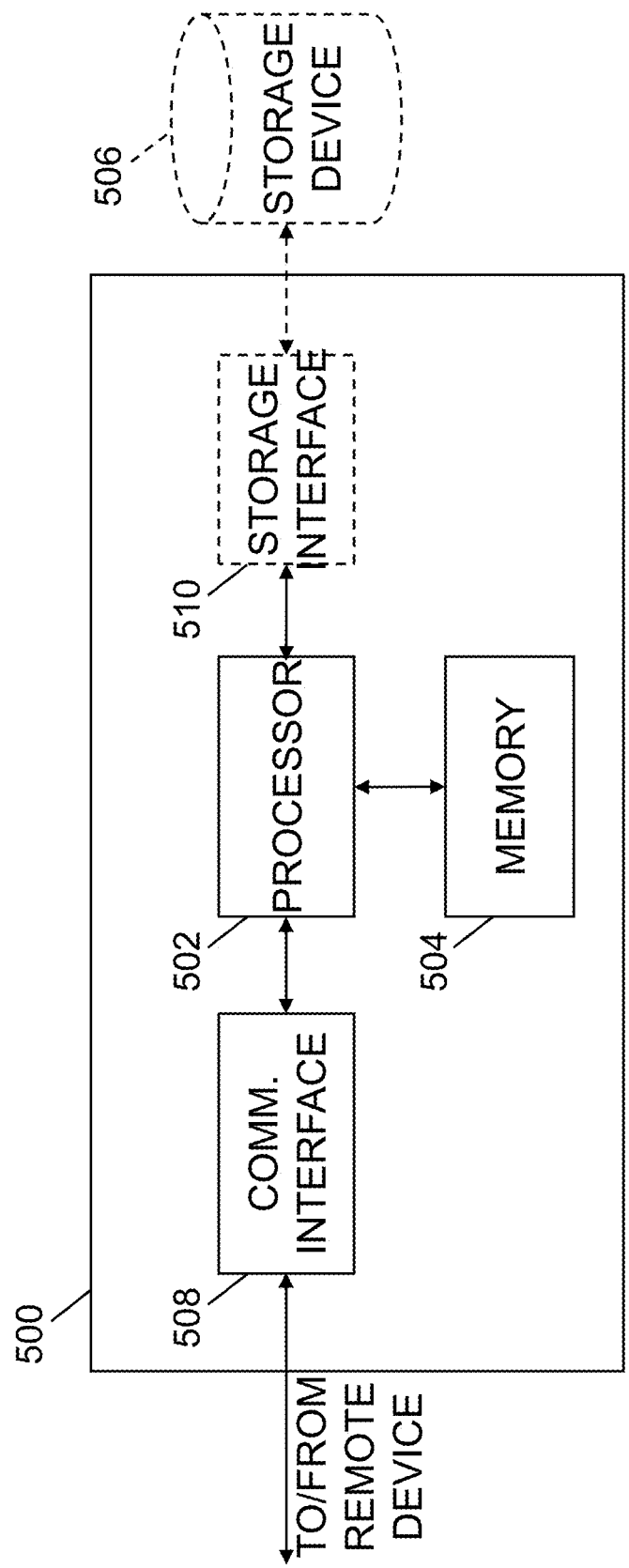

FIG. 5 illustrates an example configuration of a server computing device 500, such as used to implement a computing system of recipient 106 (e.g., an issuer processor), electronic message processing server 102, or network 108 (all shown in FIG. 1). Computing device 500 includes a processor 502 for executing instructions. Instructions may be stored to a memory 504. Processor 502 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 502 is operatively coupled to a communication interface 506 such that computing device 500 is capable of communication with remote devices. Processor 502 may also be operatively coupled to a storage device 508 (e.g., database 104, shown in FIG. 1). Storage device 508 is any computer-operated hardware suitable for storing and/or retrieving data. In some embodiments, storage device 508 is integrated in computing device 500. For example, computing device 500 may include one or more hard disk drives as storage device 508. In other embodiments, storage device 508 is external to computing device 500. For example, storage device 508 may include multiple storage units such as hard disks or solid state disks in a redundant array of inexpensive disks (RAID) configuration. Storage device 508 may include a storage area network (SAN) and/or a network attached storage (NAS) system.

In some embodiments, processor 502 is operatively coupled to storage device 508 via a storage interface 510. Storage interface is any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

Memory 504 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
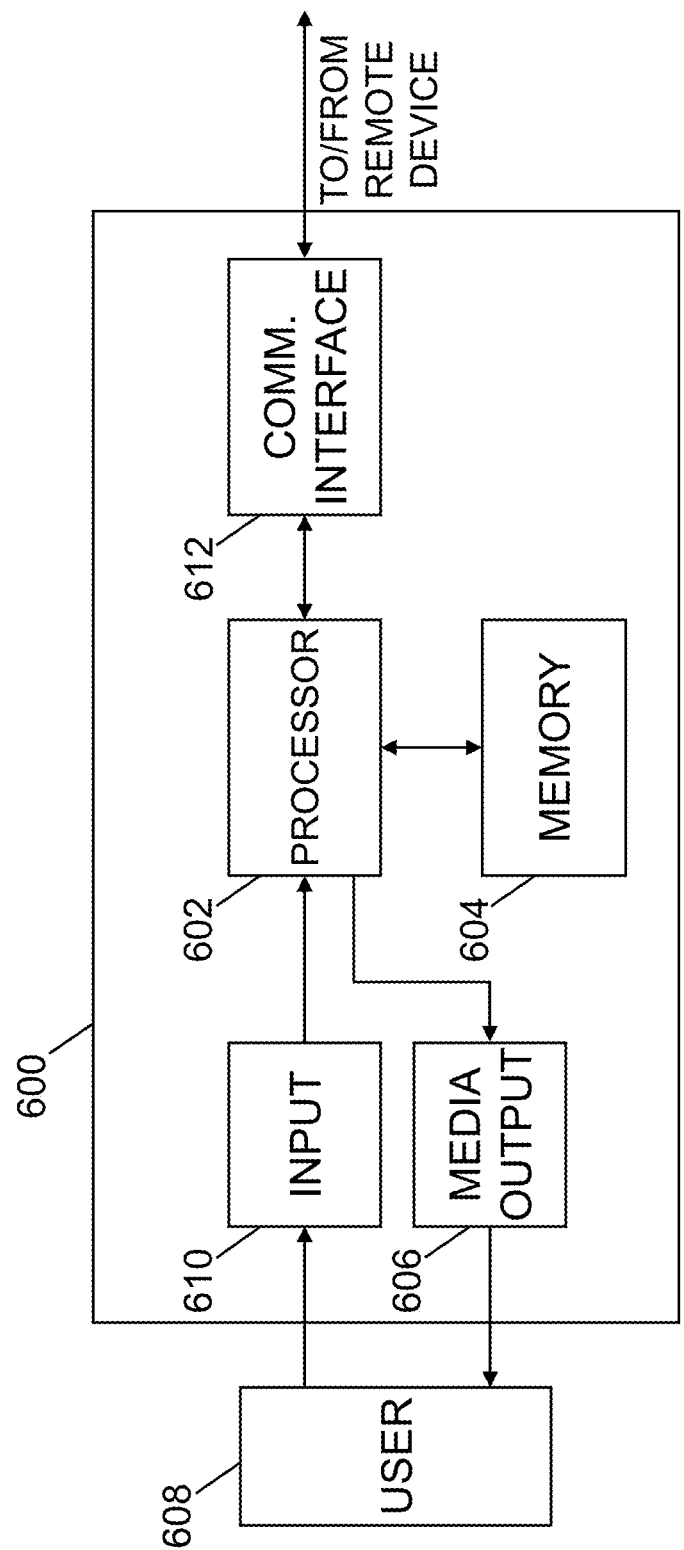

FIG. 6 illustrates an example configuration of a user system 600, such as user computing device 112 and/or a computing device accessible by a customer service representative (CSR) of recipient 106 (both shown in FIG. 1). In the example embodiment, user system 600 includes a processor 602 for executing instructions. In some embodiments, executable instructions are stored in a memory area 604. Processor 602 may include one or more processing units, for example, a multi-core configuration. Memory area 604 is any device allowing information such as executable instructions to be stored and retrieved. Memory area 604 may include one or more computer readable media.

User system 600 also includes at least one media output component 606 for presenting information to a user 608 (e.g., user 110, shown in FIG. 1). Media output component 606 is any component capable of conveying information to user 608. In some embodiments, media output component 606 includes an output adapter such as a video adapter and/or an audio adapter. An output adapter is operatively coupled to processor 602 and operatively connectable to an output device such as a display device, a liquid crystal display (LCD), organic light emitting diode (OLED) display, or "electronic ink" display, or an audio output device, a speaker or headphones.

In some embodiments, user system 600 includes an input device 610 for receiving input from user 608. Input device 610 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 606 and input device 610.

Stored in memory area 604 are, for example, computer readable instructions for providing a user interface to user 608 via media output component 606 and receiving and processing input from input device 610. A user interface may include, among other possibilities, a web browser and client application ("app").

User system 600 may also include a communication interface 612, which is communicatively connectable to a remote device (e.g., a server computing device 500, shown in FIG. 5). Communication interface 612 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 7:
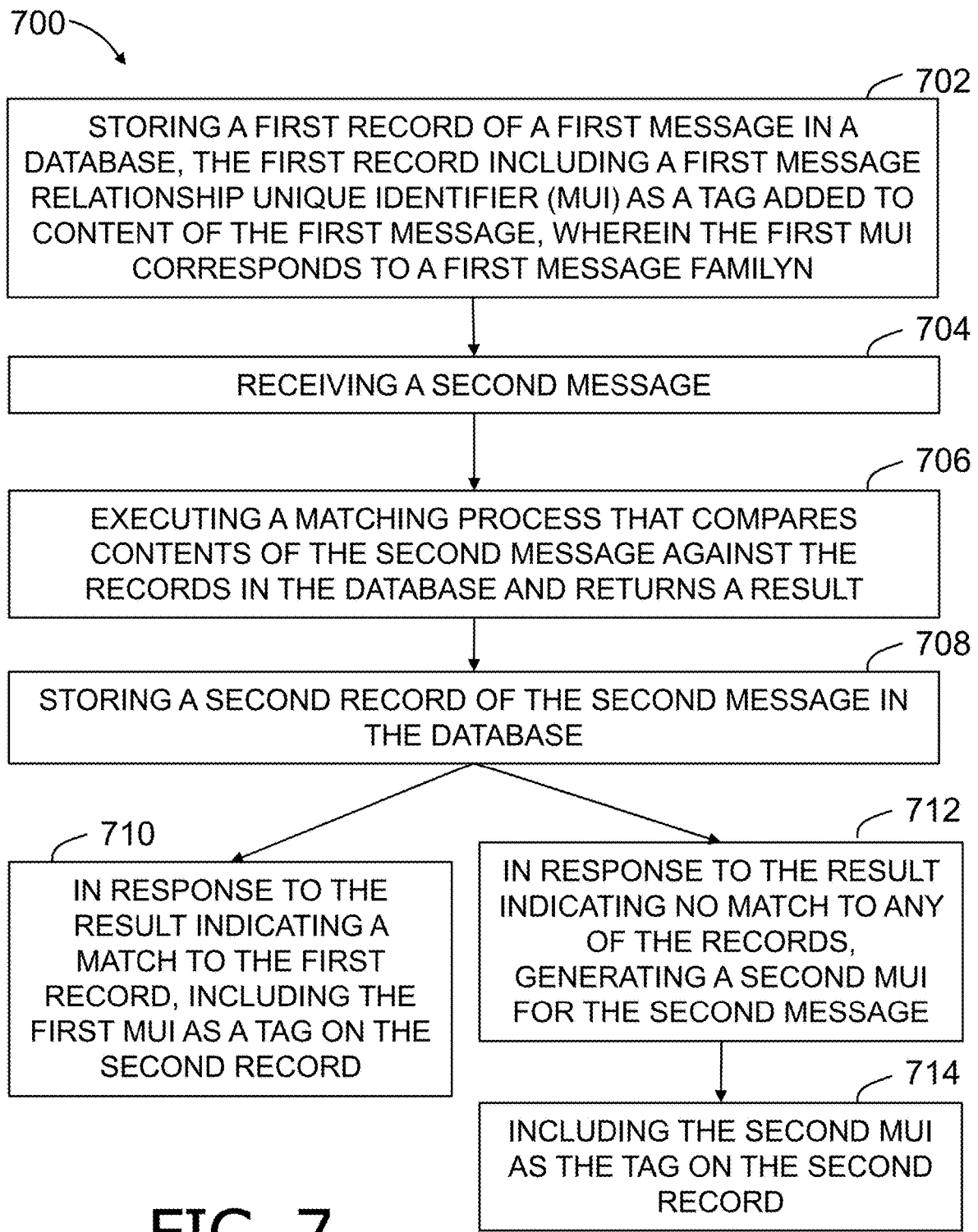

FIG. 7 is a process flow of an example method 700 for linking message records using message relationship unique identifiers (MUIs). Method 700 may be implemented at least in part by an electronic message processing server (e.g., electronic message processing server 102, shown in FIG. 1).

In the example embodiment, method 700 includes storing 702 a first record of a first message in the database. The first record includes a first message relationship unique identifier (MUI) as a tag added to content of the first message, and the first MUI corresponds to a first message family. Method 700 also includes receiving 704 a second message, and executing 706 a matching process that compares contents of the second message against the records in the database and returns a result. Method 700 further includes storing 708 a second record of the second message in the database, including, in response to the result indicating a match of the second message to the first record, including 710 the first MUI as a tag on the second record, or in response to the result indicating no match of the second message to any of the records, generating 712 a second MUI for the second message and including 714 the second MUI as the tag on the second record. The second MUI corresponds to a second message family Method 700 may include fewer, additional, and/or alternative steps. For example, in some embodiments, the executing step 706 compares the contents by comparing two or more data elements of the contents of the second message to corresponding two or more data elements of the records, wherein the data elements include a primary account number (PAN), a retrieval reference number, an approval code, and a transaction identifier.

In some embodiments, method 700 also includes (e.g., prior to storing 702) receiving the first message and generating the first MUI for the first message. In some such embodiments, generating the first MUI is performed without executing the matching process on contents of the first message, in response to identifying the first message as of a type not associable with previously received messages as discussed above. Alternatively, generating the first MUI is done after executing the matching process on contents of the first message to determine the first message is not related to any of the records.

In some embodiments, method 700 further includes transmitting a query including the first MUI to the database to retrieve the records tagged with the first MUI.

In certain embodiments of method 700, the first message corresponds to a payment transaction processed over the network and the second message corresponds to one of a settlement, a partial reversal, or a complete reversal of the payment transaction.

As will be appreciated based on the foregoing specification, the above-described embodiments of the disclosure may be implemented using computer programming or engineering techniques including computer software, firmware, hardware or any combination or subset thereof, wherein the technical effect includes enabling linking and tracking transactions within a related-transaction family. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system comprising a database configured to store a plurality of records and an electronic message processing server comprising a memory and a processor, wherein each of the records corresponds to a respective message received by the electronic message processing server via a network, the processor programmed to:
   store a first record of a first message in the database, the first record including a first message relationship unique identifier (MUI) as a tag added to content of the first message for initial storage of the first record, the first MUI corresponding to a first message family associated with a payment transaction;
   receive a second message;
   compare contents of the second message against the records in the database;
   determine that the second message is associated with the payment transaction and the first record by comparing two or more data elements of the contents of the second message to corresponding two or more data elements of the records, wherein the data elements include at least one of primary account number (PAN), a retrieval reference number, an approval code, or a transaction identifier;
   based on determining that the second message is associated with the payment transaction:
      parse the first record for the first MUI; and
      assign the first MUI to the second message;
   determine that the second message corresponds to one of a settlement, a partial reversal, or a complete reversal of the payment transaction;
   generate a second record of the second message, the second record including the first MUI and at least some of the contents of the second message to indicate that the second message corresponds to one of the settlement, the partial reversal, or the complete reversal; and
   store the second record of the second message in the database as being linked to the first record based upon the first MUI being included in the second record during initial storage of the second record, and the first MUI being included in the first record, such that, in response to a request associated with either of the first record or the second record, both the first record and the second record are provided.

2. The computer system of claim 1, wherein the processor is further programmed to:
   receive the first message; and
   generate the first MUI for the first message.

3. The computer system of claim 2, wherein the processor is further programmed to generate the first MUI in response to identifying the first message as of a type not associable with previously received messages.

4. The computer system of claim 2, wherein the processor is further programmed to generate the first MUI after determining that the first message is not related to any of the records.

5. The computer system of claim 1, wherein the processor is further programmed to transmit a query including the first MUI to the database to retrieve the records tagged with the first MUI.

6. A computer-implemented method for linking records using a message relationship unique identifier (MUI), the method implemented using a database configured to store a plurality of records and an electronic message processing server including a processor and a memory, wherein each of the records corresponds to a respective message received by the electronic message processing server via a network, the computer-implemented method comprising:
storing a first record of a first message in the database, the first record including a first MUI as a tag added to content of the first message for initial storage of the first record, the first MUI corresponding to a first message family associated with a payment transaction;
receiving a second message;
compare contents of the second message against the records in the database;
determining that the second message is associated with the payment transaction and the first record by comparing two or more data elements of the contents of the second message to corresponding two or more data elements of the records, wherein the data elements include at least one of primary account number (PAN), a retrieval reference number, an approval code, or a transaction identifier;
based on determining that the second message is associated with the payment transaction:
parsing the first record for the first MUI; and
assigning the first MUI to the second message;
determining that the second message corresponds to one of a settlement, a partial reversal, or a complete reversal of the payment transaction;
generating a second record of the second message, the second record including the first MUI and at least some of the contents of the second message to indicate that the second message corresponds to one of the settlement, the partial reversal, or the complete reversal; and
storing the second record of the second message in the database as being linked to the first record based upon the first MUI being included in the second record during initial storage of the second record, and the first MUI being included in the first record, such that, in response to a request associated with either of the first record or the second record, both the first record and the second record are provided.

7. The method of claim 6, further comprising:
receiving the first message; and
generating the first MUI for the first message.

8. The method of claim 7, wherein generating the first MUI comprises generating the first MUI in response to identifying the first message as of a type not associable with previously received messages.

9. The method of claim 7, wherein generating the first MUI comprises generating the first MUI after determining that the first message is not related to any of the records.

10. The method of claim 6, further comprising transmitting a query including the first MUI to the database to retrieve the records tagged with the first MUI.

11. At least one non-transitory computer-readable storage medium having computer-executable instructions stored thereon, wherein, when executed by a processor of an electronic message processing server, the processor in communication with a database configured to store a plurality of records, each of the records corresponding to a respective message received by the electronic message processing server via a network, the computer-executable instructions cause the processor to:
store a first record of a first message in the database, the first record including a first message relationship unique identifier (MUI) as a tag added to content of the first message for initial storage of the first record, the first MUI corresponding to a first message family associated with a payment transaction;
receive a second message;
compare contents of the second message against the records in the database;
determine that the second message is associated with the payment transaction and the first record by comparing two or more data elements of the contents of the second message to corresponding two or more data elements of the records, wherein the data elements include at least one of primary account number (PAN), a retrieval reference number, an approval code, or a transaction identifier;
based on determining that the second message is associated with the payment transaction:
parse the first record for the first MUI; and
assign the first MUI to the second message;
determine that the second message corresponds to one of a settlement, a partial reversal, or a complete reversal of the payment transaction;
generate a second record of the second message, the second record including the first MUI and at least some of the contents of the second message to indicate that the second message corresponds to one of the settlement, the partial reversal, or the complete reversal; and
store the second record of the second message in the database as being linked to the first record based upon the first MUI being included in the second record during initial storage of the second record, and the first MUI being included in the first record, such that, in response to a request associated with either of the first record or the second record, both the first record and the second record are provided.

12. The non-transitory computer-readable storage medium of claim 11, wherein the computer-executable instructions further cause the processor to:
receive the first message; and
generate the first MUI for the first message.

13. The non-transitory computer-readable storage medium of claim 12, wherein the computer-executable instructions further cause the processor to generate the first MUI in response to identifying the first message as of a type not associable with previously received messages.

14. The non-transitory computer-readable storage medium of claim 12, wherein the computer-executable instructions further cause the processor to generate the first MUI after determining that the first message is not related to any of the records.

15. The non-transitory computer-readable storage medium of claim 11, wherein the computer-executable instructions further cause the processor to transmit a query including the first MUI to the database to retrieve the records tagged with the first MUI.

16. The computer system of claim 1, wherein at least one of the first message or the second message are received in compliance with at least one of an International Organization for Standardization (ISO) 8583 standard or an ISO 20022 standard.

\* \* \* \* \*